United States Patent
Kempfle et al.

(10) Patent No.: US 11,624,645 B2
(45) Date of Patent: Apr. 11, 2023

(54) METHOD AND REFRIGERATING DEVICE FOR DETERMINING AN OBJECT WEIGHT OF AN OBJECT FOR REFRIGERATION

(71) Applicant: BSH Hausgeraete GmbH, Munich (DE)

(72) Inventors: Stephan Kempfle, Ellzee (DE); Joachim Schaeferling, Bissingen (DE); Gerhard Wetzl, Sontheim (DE)

(73) Assignee: BSH Hausgeraete GmbH, Munich (DE)

( * ) Notice: Subject to any disclaimer, the term of this patent is extended or adjusted under 35 U.S.C. 154(b) by 264 days.

(21) Appl. No.: 17/065,686

(22) Filed: Oct. 8, 2020

(65) Prior Publication Data

US 2021/0108957 A1  Apr. 15, 2021

(30) Foreign Application Priority Data

Oct. 11, 2019  (DE) .............................. 102019215614

(51) Int. Cl.
*G01G 19/14* (2006.01)
*F25D 25/02* (2006.01)
(Continued)

(52) U.S. Cl.
CPC ............. *G01G 19/14* (2013.01); *F25D 25/02* (2013.01); *F25D 29/00* (2013.01); *G01G 19/52* (2013.01);
(Continued)

(58) Field of Classification Search
CPC .......... G01G 19/14; G01G 19/52; G06T 7/62; G06T 11/00; G06V 20/00; F25D 2700/04; F25D 2700/06; F25D 25/02; F25D 29/00
See application file for complete search history.

(56) References Cited

U.S. PATENT DOCUMENTS 9,146,146 B2 * 9/2015 Laird ..................... G01G 19/00
9,903,751 B1 * 2/2018 Ostrow .................. G01G 21/22
(Continued)

FOREIGN PATENT DOCUMENTS

JP  2004323118 A  11/2004
JP  2007017052 A  1/2007
JP  2013120048 A  6/2013

*Primary Examiner* — Randy W Gibson
(74) *Attorney, Agent, or Firm* — Laurence A. Greenberg; Werner H. Stemer; Ralph E. Locher

(57) ABSTRACT

A method serves for determining an object weight of an object that is put on a weighing zone, which has a plurality of weighing plates arranged in a grid pattern, of a household refrigerator. The respective weights are measured by the weighing plates and an image is taken of the weighing zone. From the image, respective percentages of support surfaces of the object stored on the weighing zone in relation to the individual weighing plates are determined. From the weights measured at the weighing plates and the proportions of the support surfaces the object weight of the respective object is determined, and advantageously the determined object weight of the object is stored in a database. A refrigerating device has a household refrigerator with a refrigerating compartment having a weighing zone with a plurality of weighing plates arranged in a grid pattern. The refrigerating device is intended for performing the method.

14 Claims, 4 Drawing Sheets

(51) Int. Cl.
  *F25D 29/00* (2006.01)
  *G06T 7/62* (2017.01)
  *G06T 11/00* (2006.01)
  *G01G 19/52* (2006.01)
  *G06V 20/00* (2022.01)

(52) U.S. Cl.
  CPC ............... *G06T 7/62* (2017.01); *G06T 11/00* (2013.01); *G06V 20/00* (2022.01); *F25D 2700/04* (2013.01)

(56) References Cited

U.S. PATENT DOCUMENTS

| | | | |
|---|---|---|---|
| 2010/0139989 A1* | 6/2010 | Atwater | G01G 23/3735 |
| | | | 382/199 |
| 2018/0082246 A1* | 3/2018 | Jones | G06Q 10/087 |
| 2018/0259247 A1* | 9/2018 | Werner | F25D 29/005 |
| 2021/0108958 A1* | 4/2021 | Kempfle | F25D 23/04 |

\* cited by examiner

METHOD AND REFRIGERATING DEVICE FOR DETERMINING AN OBJECT WEIGHT OF AN OBJECT FOR REFRIGERATION

CROSS-REFERENCE TO RELATED APPLICATION

This application claims the priority, under 35 U.S.C. § 119, of German application DE 10 2019 215 614, filed Oct. 11, 2019; the prior application is herewith incorporated by reference in its entirety.

BACKGROUND OF THE INVENTION

Field of the Invention

The invention relates to a method for determining a weight ("object weight") of at least one object or article that is put on a weighing zone, which has a plurality of weighing plates arranged in a grid pattern, of a household refrigerator, in which respective weights are measured by the weighing plates. The invention also relates to a refrigerating device at least having a household refrigerator with a refrigerating compartment that has a weighing zone with a plurality of weighing plates arranged in a grid pattern, wherein the refrigerating device is intended for performing the method. The invention is particularly advantageously applicable for objects for refrigeration that are put in a door tray of a refrigerator equipped with a weighing zone of this kind.

Japanese patent application JP 2013120048 A discloses a weight sensor that is arranged on a compartment support in a refrigerator and has a set of four weight sensor, wherein a storage condition of food in a storage container is determined by a strain gauge sensor that is arranged between the storage container and a compartment support.

Japanese patent application JP 2007017052 A discloses a storage management device for articles stored in a refrigerator. The refrigerator contains a dish with a weight sensor, a weight detection device with a weight sensor that detects an object weight of articles, and a data processing device that calculates a number of articles by dividing the detected object weight by a weight per article, and a data store that stores the number of stored articles.

Japanese patent application JP 2004323118 A discloses a weight measuring device that calculates a weight of food from a signal output by a weight sensor. The calculated weight is stored in a storage device, as the value of an initial weight of foodstuffs. A reset device can be used to reset the weight value stored in the storage device. The initial weight value is compared with a current weight value, which is calculated by the weight measuring device, in order to calculate the remaining quantity and to inform the user of the remaining quantity by way of an information device.

BRIEF SUMMARY OF THE INVENTION

It is the object of the present invention to at least partly overcome the disadvantages of the prior art and to provide a particularly user-friendly way of automatically determining a weight of objects or articles put in a refrigerating compartment of a household refrigerator and of informing a user of this.

This object is achieved by the features of the independent claims. Advantageous embodiments form the subject matter of the dependent claims, the description and the drawings.

The object is achieved by a method for determining a weight ("object weight") of at least one object or article (also designated the "object for refrigeration") that is put on a weighing zone, which has a plurality of weighing plates arranged in a grid pattern, of a household refrigerator. The respective weights are measured by the weighing plates and at least one image is taken of the weighing zone. From the at least one image, respective percentages of support surfaces of the at least one object stored on the weighing zone in relation to the individual weighing plates are determined. From the weights measured by the weighing plates and the proportions of the support surfaces the object weight of the respective at least one object is determined.

This method produces the advantage that the object weight of an object put on the weighing zone can be automatically determined particularly reliably in a structurally simple and inexpensive manner by a combination of a weight measurement at a specific location and an image-based recognition of the support surfaces of this object, even if a plurality of objects has been stored such that they are distributed over the individual weighing plates. As a result, the weighing zone need have only comparatively few weighing plates, by comparison with a weighing zone that specifies location very precisely and has a large number of small weighing plates. It is also possible to determine the position and number of the objects on the weighing zone using the method. The method thus provides a user with more information on objects located on the weighing zone, in particular by comparison with a simple taking of an image or only a determination of weight.

In a development, at least the determined object weight of the respective at least one object is stored in a database. This gives a user the possibility of particularly clearly viewable storage of the objects. In addition, for example an object recognition or object ID and/or a position of the objects in the database may be stored. The database may be located in the household refrigerator and/or in an external instance.

In a development, the household refrigerator has a fridge (for example a combined fridge/freezer) or is a fridge. The household refrigerator has in particular a coolable utilizable compartment ("refrigerating compartment") that can be closed by a door.

The fact that the weighing zone (which can also be designated a balance) comprises a plurality of weighing plates arranged in a grid pattern means, in a development, that the weighing plates are arranged next to one another, virtually directly or with no gaps. This makes it possible to determine an object weight particularly precisely. For example, the grid pattern may be a matrix pattern. The weighing plates may have an at least approximately rectangular weighing surface. For example, the weighing zone may comprise a (6×2) pattern, a (6×3) pattern or a (12×2) pattern of weighing plates. Each of the weighing plates can be used to measure a weight stored on it.

The fact that at least one image of the weighing zone is taken means that in this way objects put on the weighing zone can also be taken. The at least one image is advantageously taken in a view looking from obliquely above the weighing zone in order to be able to detect the whole of the weighing zone and to be able to carry out reliable recognition of the support surfaces of the objects.

In a development, the at least one image is taken by at least one camera that is permanently installed in the refrigerator (a so-called CIF or Camera in Fridge). In order to determine the support surfaces particularly reliably, it is advantageous that images of the weighing zone are taken and evaluated by a plurality of cameras from different points of view. The at least one camera may be arranged for example in the carcass (for example in the ceiling thereof)

and/or in a door of a refrigerating compartment. The camera can also be used to determine a number and position of the objects put on the weighing zone particularly simply and precisely.

The weights on the weighing plates, or the weight data, and the at least one image of the weighing zone are advantageously measured or taken at at least approximately the same time, for example while the door of the refrigerating compartment is being opened and/or closed. In this way, the possibility that the objects differ between the taking of an image and measurement of the weights (e.g. objects are removed, displaced or added) can be avoided particularly reliably.

In one embodiment, for the purpose of determining the proportions of the support surfaces, the grid pattern of the weighing plates is overlaid on the at least one image that is taken of the weighing zone. This produces the advantage that it is particularly simple to associate image regions with the weighing plates, and hence also the correlation of the support surfaces of the objects with the individual weighing plates can be determined particularly simply. An overlaying of this kind can be understood to mean that it is known which image regions or pixels are associated with the individual weighing plates. This can comprise storing the dimension of the grid pattern or the spatial division of the weighing plates of the weighing zone in an image or in the camera—taking into account the geometric relationship between the camera and the weighing zone. Thus, determining the percentages of the support surfaces contains a spatial determination of a support surface of an object on the weighing zone—for example its border—and an image-based association with the individual weighing plates covered thereby. For example, it may be identified that 20% of a support surface of a particular object is located on a first weighing plate, 50% on a second weighing plate adjacent thereto, and 30% on a third weighing plate adjacent to the second weighing plate.

The database may be a component of a storage system that can be interrogated by a user. For example, the user may retrieve the objects on the weighing zone and their associated weights by way of an application program (app) installed on a mobile user terminal such as a smartphone or tablet PC, or similar. In a development, the storage makes it possible to maintain a stock list of available objects, or food linked with the objects, in the refrigerator, for interrogation by a user, to interrogate or list whether certain food linked with the objects is present, for a particular recipe, and/or, if a quantity of a particular food falls below a predetermined minimum, to place an automatic order or generate a message to a user and/or draw up a virtual shopping list for a user, etc.

In a development, using the at least one image, an object recognition is performed in relation to the at least one object, and a type of the recognized object is stored in the database such that it is linked with its object weight. As a result, the storage may be made even more clearly viewable for a user, since the type of the at least one object can also be automatically displayed to the user. The type of a weighed object may comprise a type of a content of the object and/or a type of the packaging. For example, the content of the object may comprise recognition of milk, juice, butter, etc. The type of packaging may comprise recognition or determination of a 1-liter Tetra Pak packaging, a gallon or half-gallon bottle, etc. Depending on the precision of object recognition and/or the extent of stored reference data, the type of the object may be determined more precisely, for example the type of milk (full-fat milk, skimmed milk, etc.), the type of juice (orange juice, etc.), a best-before date, etc. For this purpose, in the context of object recognition optical character recognition (OCR) may also be performed. Thus, if a user puts an object on the weighing zone, the entries "1-liter carton of full-fat milk" and "400 g" may be stored in the database, for example.

In a development, the type of the weighed object may also be input by a user and stored in the database. This is advantageous for example if the object recognition does not recognize the object, or not in enough detail for a user. For example, a user may associate the type "carrot/celery juice" with a particular weighed object—for example by way of the app.

In one embodiment, a volume of liquid is determined from the determined object weight of the at least one weighed object and its recognized type as a liquid container. The liquid volume can be stored in the database such that it is linked with this object. This produces the advantage that, for liquids, the information provided to a user is not the weight but—usually more familiar to a user—the liquid volume, e.g. 0.5 l. This also makes it easier to draw up an electronic shopping list or to check it against a recipe. This conversion exploits the fact that a weight of liquid food often corresponds sufficiently precisely to the weight of water, with the result that it is possible to infer the volume of the associated object from its determined weight. However, the liquid volume can be determined even more precisely when there is a known or stored relationship between the weight of the liquid and its volume. This is particularly useful if the density of the liquid differs markedly from the density of water, e.g. in the case of soups.

If the type of packaging is also determinable by object recognition and if the weight of the packaging is known, then the liquid volume can be determined even more precisely by subtracting the weight of the packaging from the measured object weight.

In a development, by comparing the determined liquid volume with a stored volume of packaging of the object, a filling level is determined, for example as a percentage or in categorized divisions such as "full", "almost full", "half full", "almost empty", etc., wherein in the case of categorized divisions ranges of the liquid volume that fit the categories are stored.

In one embodiment, from the weights measured at the weighing plates and the proportions of the support surfaces of an object, proportions of the weight of this object on the weighing plates it occupies are determined, and the object weight is calculated by adding these weight proportions together. As a result, the weight of the object can be determined particularly precisely, in particular if a plurality of objects are distributed over a plurality of weighing plates and a plurality of objects are respectively put on one or more weighing plates.

In one embodiment, when precisely one object is recognized on one of the weighing plates, its object weight is calculated by dividing the weight value recorded at this weighing plate by the proportion of the support surface there. This produces the advantage that the calculation of the object weight of the object can be performed particularly simply. If for example it is recognized that on one of the weighing plates there has been stored precisely one object K having a surface proportion $A=60\%$ of its total support surface, then its object weight O can be determined from the weight G determined at this weighing plate in a simple manner, from $O=G/A$. If this applies to a plurality of weighing plates, then for a particularly reliable calculation advantageously weighing plate corresponding to the greatest proportion of a support surface is used. In this embodiment, the object is thus put by itself on at least one weighing plate, but not necessarily by itself on all the weighing plates it occupies.

In one embodiment, the object weights of a plurality of objects are determined by solving a linear equation system M·x=b (where appropriate including one or more additional conditions), where the proportions of the support surfaces of the objects correspond to the coefficients of the coefficient matrix M, the object weights O correspond to the unknowns of the vector x, and the weights measured at the individual weighing plates correspond to the inputs for the vector b. This produces the advantage that the object weight of a plurality of objects that lie on the weighing plates in an overlapping manner can be calculated numerically in a particularly simple manner.

In one embodiment, the weights are measured at specific points in time. This advantageously makes it possible to determine the object weight of an object put on the weighing zone even more precisely. If for example an increase in weight is recognized at certain weighing plates within a predetermined time window, this can be associated with putting on a particular object. In that case, by evaluating—in particular, simply adding—the increases in weight recognized at the individual weighing plates, it is possible to infer directly the weight of the object, without even having recourse to the camera. The camera can then be used to recognize the type of the object put on. Since it is known which weighing plates were the location of the weight increase and so the position of the object is at least approximately known, this information allows the image-based object recognition to be simplified or improved.

In one embodiment, it is determined from the at least one image whether at least one object has been put by itself on the weighing plates, and then the associated object weight is determined directly from the weight measured at these weighing plates. This produces the advantage that the object weight can be determined particularly precisely because the proportion of the surface, or the percentages of the support surfaces, are not part of this determination. In particular, for this object for refrigeration it is even possible to dispense with determining the percentages of the support surfaces entirely, which advantageously reduces computing effort. Determining whether at least one object has been put by itself on the weighing plates includes determining whether only this object is located on all the weighing plates it occupies. In that case, there is thus no weighing plate on which this object for refrigeration and at the same time another object are put. This also includes the case in which this object lies on only one weighing plate. Directly determining the object weight advantageously comprises adding the measured weights of the weighing plates occupied by this object for refrigeration. If the object lies on only one weighing plate, the weight measured at this weighing plate corresponds to the object weight.

In one embodiment, it is recognized by means of the method whether a certain object put on the weighing zone has been put on the weighing zone previously. This makes it possible to determine from a before-and-after comparison changes to the object properties, such as a change in weight. This may be implemented for example such that it is recognized that the object put on the weighing zone corresponds in type to an object previously put on the weighing zone, and the object previously put on the weighing zone is recognizably no longer present. If moreover the weight of the object currently put on the weighing zone is less than the object previously put on the weighing zone, then it can be assumed that this object has been removed and put back again after use.

The object is also achieved by a refrigerating device at least having a household refrigerator with a refrigerating compartment that has a weighing zone with a plurality of weighing plates arranged in a grid pattern, wherein the refrigerating device is intended for performing the method as described above. The refrigerating device may take a form analogous to the method and has the same advantages.

In one embodiment, the weighing zone is located in a door tray of a door of the household refrigerator. In particular, the base of the door tray is virtually entirely formed by or in the form of the weighing zone. As an alternative or in addition, there may be at least one weighing zone on a storage surface in the refrigerating compartment of the refrigerator, for example on a storage compartment.

In one embodiment, the door tray, or at least its lateral edge, may be made from a transparent material, which simplifies object recognition by the camera, and in particular improves visibility of the support surface of the objects on the weighing zone when the camera is arranged obliquely in relation to the weighing zone.

In one embodiment, the household refrigerator corresponds to the refrigerating device and has a data processing device for performing the method. In this way, advantageously the household refrigerator enables autonomous or largely autonomous automated storage to be provided. The data processing device may be a self-contained component of the refrigerator, be functionally integrated in a controller of the weighing zone, and/or be integrated in a control unit of the refrigerator.

In one embodiment, the household refrigerator has a communication device for data exchange with an external instance, and is intended for transmitting the measured weights and the at least one image to the external instance, and the external instance is intended to determine from these the object weights of at least one respective object. This allows the work for performing the method to be shifted out of the household refrigerator and onto the external unit, as a result of which the household refrigerator can be implemented particularly simply and inexpensively. The refrigerating device according to this embodiment can in that case also be regarded or designated as a system containing a household refrigerator and an external instance coupled thereto by data communications. The external instance may for example be a network server, a network-based computer (Cloud computer) and/or a mobile user terminal. The communication device may be a wireless communication device such as a WiFi module, Bluetooth module, etc. and/or a wired communication device such as an Ethernet module, etc.

Other features which are considered as characteristic for the invention are set forth in the appended claims.

Although the invention is illustrated and described herein as embodied in a method and refrigerating device for determining an object weight of an object for refrigeration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a plan view showing a weighing zone of the door tray from

FIG. 3, with an object put on it;

DETAILED DESCRIPTION OF THE INVENTION

Figure 1:
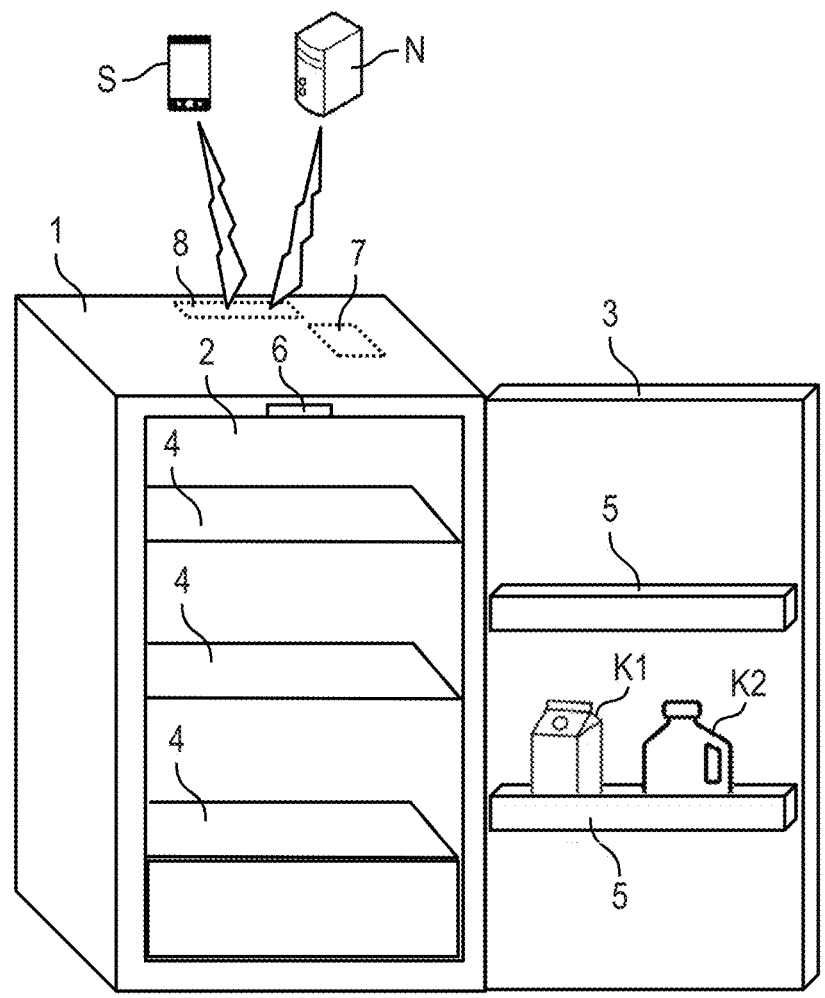
FIG. 1 is a diagrammatic, perspective view a refrigerator with an open refrigerator door that has a plurality of door trays on the inside.

Referring now to the figures of the drawings in detail and first, particularly to FIG. 1 thereof, there is shown a refrigerator 1 with a refrigerating compartment 2 that can be closed by a refrigerator door 3, here illustrated as open. Objects for refrigeration K1, K2 can be stored on storage compartments 4 of the refrigerating compartment 2 and in door trays 5. The door trays 5 are arranged on an inner side of the refrigerator door 3. Further, the refrigerator 1 has a camera 6 that is permanently integrated in a ceiling of the refrigerating compartment 2 and by means of which images of at least one of the door trays 5 can be taken, for example when the refrigerator door 3 is in a predetermined angular position as it is closed. In this context, the images also include the objects for refrigeration K1 and K2 that are stored in the door trays 5.

Moreover, the refrigerator 1 has a central control unit 7 that is coupled to the camera 6 and is intended for image evaluation of images taken by means of the camera 6.

Optionally, the refrigerator 1 has at least one communication module 8 (e.g. a Bluetooth module, a WiFi module and/or an Ethernet module) for communicating with at least one external instance, e.g. a network server N, a Cloud computer (not illustrated) and/or a mobile user terminal S. The external instance S, N may be equipped with a database.

Figure 2:
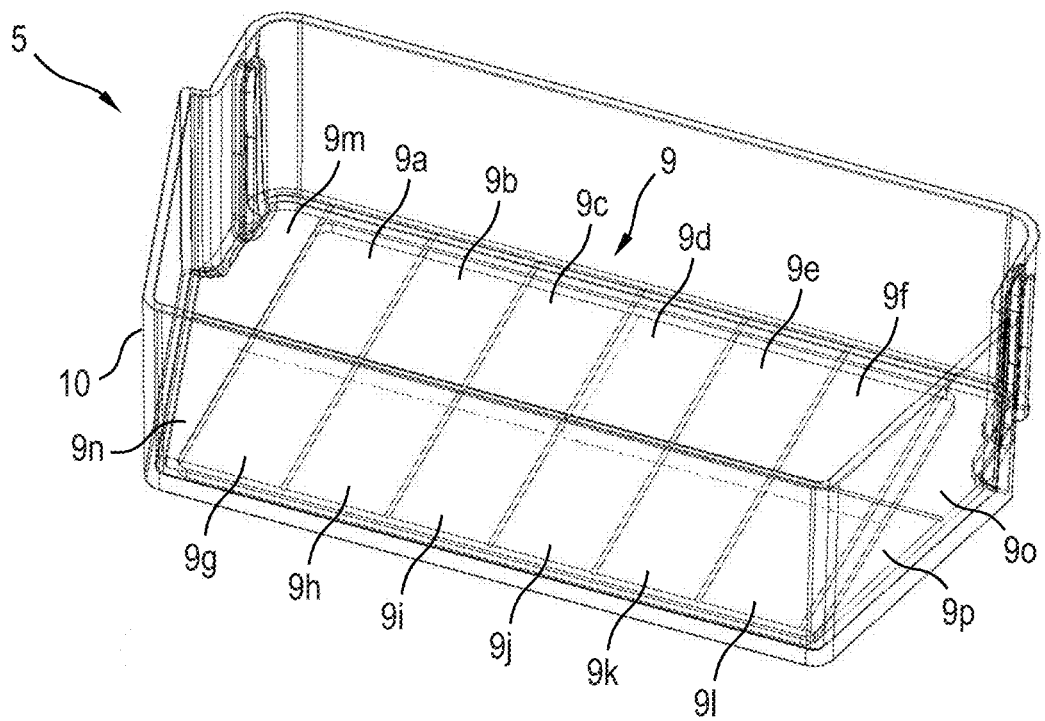
FIG. 2 is a perspective view from above, of a door tray with a weighing zone.
Figure 3:
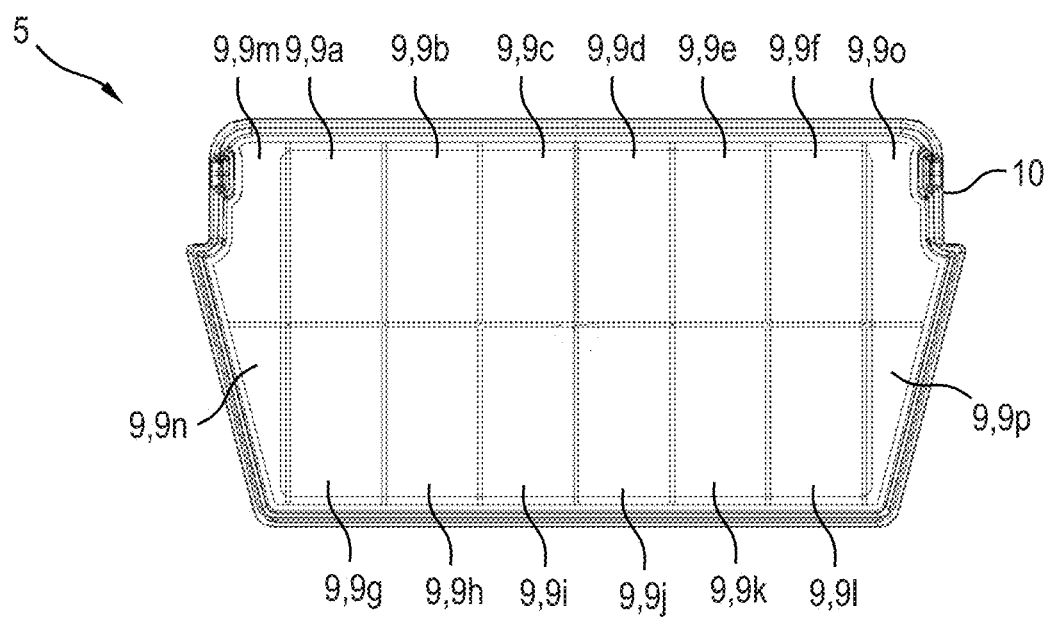
FIG. 3 is a top plan view of the door tray from FIG. 2.

FIG. 2 shows, in a view from obliquely above, a door tray 5 with a weighing zone 9 that lies on a base of the door tray 5 or forms the base. The door tray 5 as such (without the weighing zone 9) has optically transparent side walls 10 and is advantageously made entirely from an optically transparent material, e.g. plastics material. FIG. 3 shows the door tray 5 in plan view.

The weighing zone 9 has twelve rectangular weighing plates 9a to 9l, which are arranged in a (6×2) matrix grid pattern, next to one another with virtually no gaps. Further, the weighing zone 9 may additionally have further weighing plates 9m to 9p for the purpose of filling in the base of the door tray 5 at the edge, in which case there is a (8×2) matrix grid pattern. The further weighing plates 9m to 9p have a different shape and/or size from the weighing plates 9a to 9l. The weighing zone 9 has a controller (not illustrated), which receives the analog measurement data generated by the weighing plates 9a to 9p and converts it into corresponding weight data.

In the image taken by the camera 6, image portions or partial images corresponding to the borders or surfaces of the individual weighing plates 9a to 9p can be identified, with the result that the weight measured by the corresponding weighing plate 9a to 9p can be associated with each partial image. To put it another way, the grid pattern of the weighing plates 9a to 9p is overlaid on the at least one image of the weighing zone 9 that is taken. This is possible even if the camera 6 is oriented obliquely in relation to the weighing zone 9. As a result, by means of the control unit 7 it is possible to determine from the image, in a comparatively simple manner, percentages of (partial) support surfaces of the objects for refrigeration K1, K2 in respect of the individual weighing plates 9a to 9p. From the weights measured at the weighing plates 9a to 9p and the proportions of the (partial) support surfaces of the objects for refrigeration K1, K2, the object weights O(K1) and O(K2) of the respective objects for refrigeration K1 and K2 respectively are then determined by the control unit 7 and stored in a database that is internal to the device or external to the device (e.g. integrated in the external instance S, N).

Moreover, by means of the control unit 7, in an image of the camera 6 there is performed a recognition of an object for refrigeration in relation to the objects for refrigeration K1, K2 that are put on the weighing zone 9 and weighed there, and from this a type of the objects for refrigeration K1, K2 is recognized—in this case a milk carton K in a 1-liter package and a juice bottle K2 in a half-gallon package. The type of the objects for refrigeration K1, K2 is stored in the database, such that it is linked with their object weights O(K1), O(K2).

Figure 4:
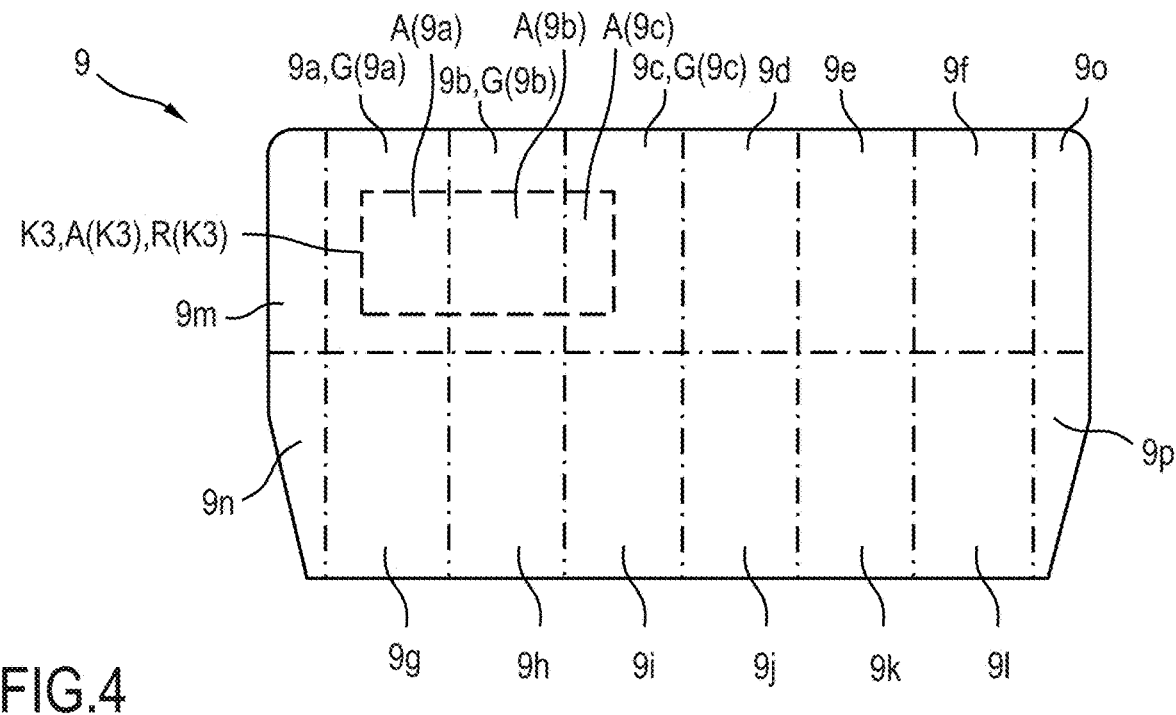

FIG. 4 shows, in plan view, the weighing zone 9 of the door tray 5, with an object for refrigeration K3 put on it. As determined by image evaluation, the object for refrigeration K3 has a support surface A(K3) determined by an edge R(K3). As a result of image evaluation utilizing the grid of the weighing plates 9a to 9p that is overlaid on the image, the proportions of the support surfaces A(9a), A(9b) and A(9c) of the object for refrigeration K3 that are supported on the weighing plates 9a, 9b and 9c respectively are determined and linked with the weights G(9a), G(9b) and G(9c) that are measured at the corresponding weighing plates 9a, 9b, 9c respectively.

In the present case, for example A(9a)=20%, A(9b)=70% and A(9c)=10% of the total support surface A(K3), and G(9a)=200 g, G(9b)=700 g and G(9c)=100 g.

The object weight O(K3) of the object for refrigeration K3 can be calculated directly in a first variant, from:

$$O(K3)=G(9a)+G(9b)+G(9c)=200\ g+700g+100g=1000\ g$$

because no other objects have been put on the weighing plates 9a, 9b and 9c. This can be recognized from the image evaluation. In this case, the proportions of the support surfaces A(9a), A(9b) and A(9c) respectively do not need to be determined, which is a saving on computing effort.

In a second variant, the object weight O(K3) of the object for refrigeration K3 can be calculated from:

$$O(K3)=G(9b)/A(9b)=700\ g/0.7=1000\ g$$

(and analogously from the weighing plates 9a and 9c), since only the one object for refrigeration K3 is supported there.

However, the object weight O(K3) of the object for refrigeration K3 can also be solved algorithmically by formal solution of a linear equation system with only one unknown.

If, as a result of recognition of an object for refrigeration, the type of packaging of the object for refrigeration K3 is also recognized and the weight of the packaging is known, then the weight of the content of the object for refrigeration K3 can be inferred by subtracting the weight of the packaging accordingly. If, further, it is recognized from the type of packaging of the object for refrigeration K3 that it is a liquid container, then an at least approximate filling level of the liquid in the object for refrigeration K3 can also be calculated.

Figure 5:
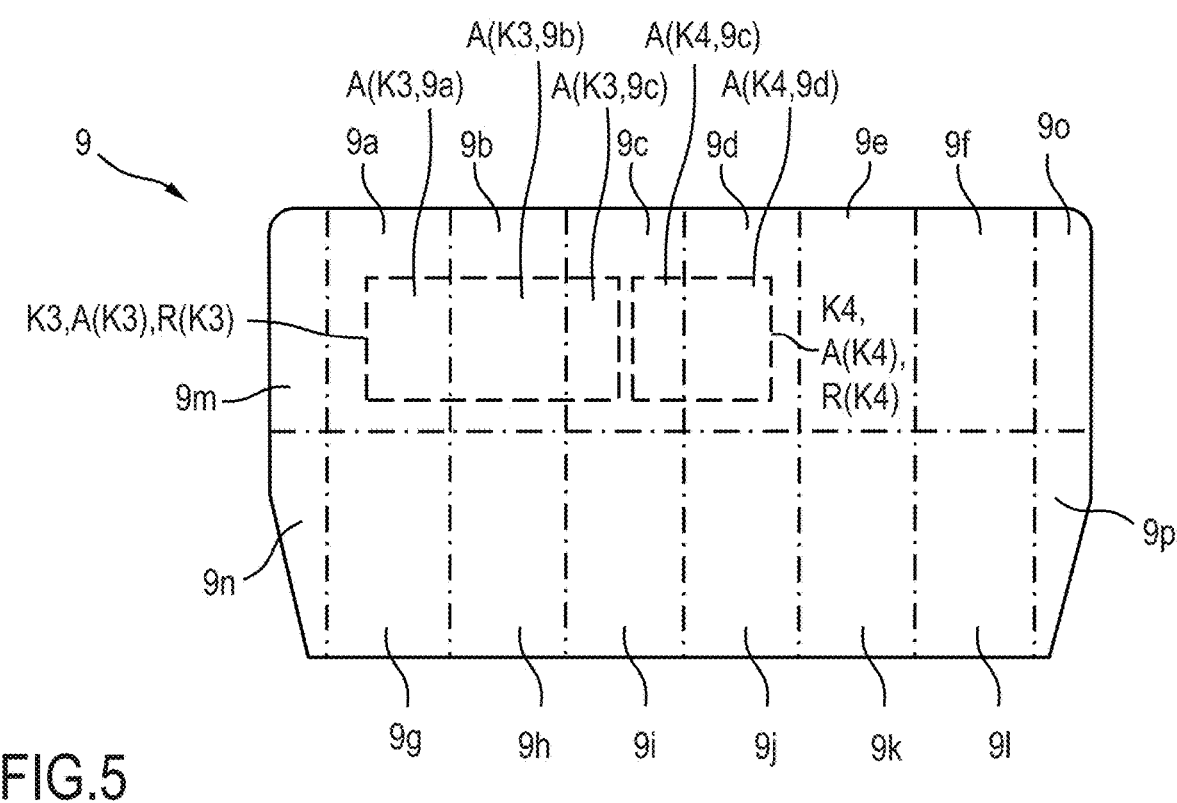
FIG. 5 is a plan view showing the weighing zone of the door tray from FIG. 3, with two objects put on it.

FIG. 5 shows, in plan view, the weighing zone 9 with two objects for refrigeration K3 and K4 put on it. The object for refrigeration K4 that has been put down in addition to the object for refrigeration K3 that was already described in FIG. 4 is supported on the weighing plates 9c and 9d, in this case by way of example by the proportions of the support surfaces A(K4, 9c)=40% and A(K3, 9d)=60%.

The object weights O(K3) and O(K4) of the objects for refrigeration K3 and K4 respectively may in turn be calculated for example from:

$$O(K3)=G(9b)/A(9b)=700\ g/0.7=1000\ g\ \text{and}$$

$$O(K4)=G(9d)/A(9d)=300\ g/0.6=500\ g$$

or alternatively by solving a linear equation system. On the weighing plate 9c, the respective weight proportions G(K3, 9c) and G(K4, 9c) must correspond to the weight G(9c) measured there, which can also be expressed as $$G(9c)=O(K3)*A(K3,\ 9c)+O(K4)*A(K4,\ 9c)=1000g*0.1+500\ g*0.4=300\ g.$$

This calculation may be used for example as a plausibility check.

Figure 6:
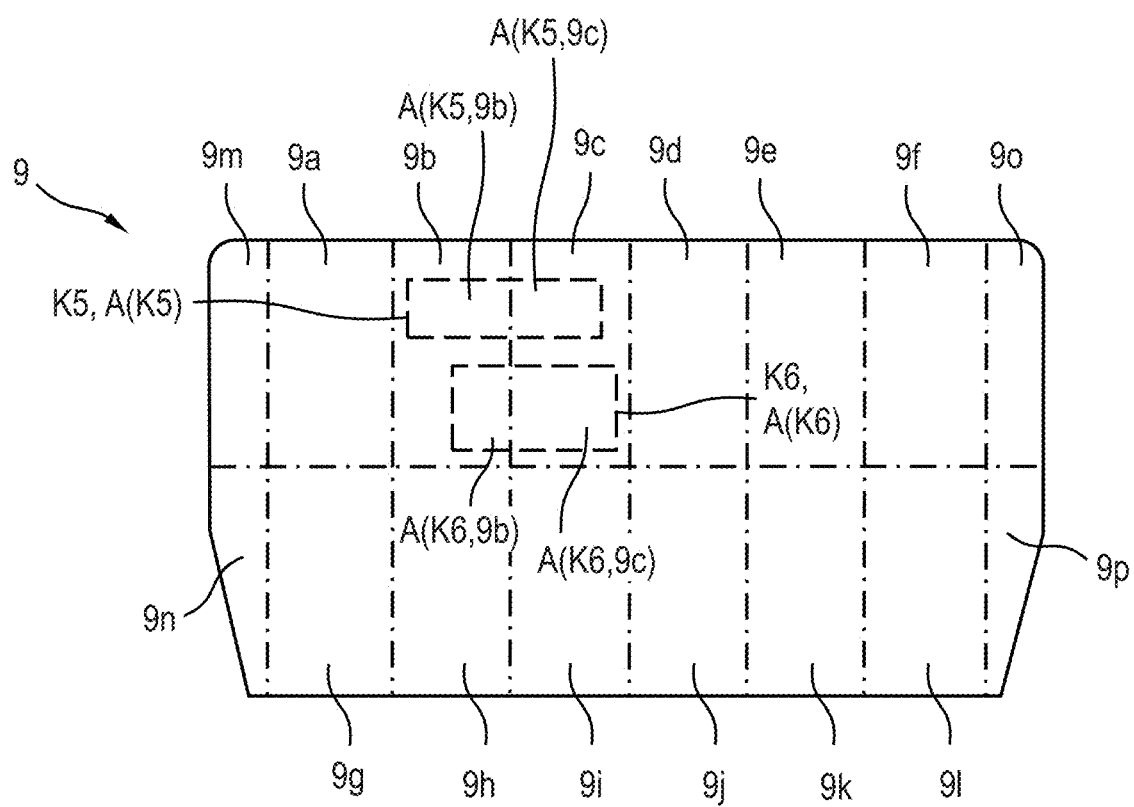
FIG. 6 is a plan view showing the weighing zone of the door tray from FIG. 3, with two objects put on it, in an arrangement different from FIG. 5.

FIG. 6 shows, in plan view, the weighing zone 9 of the door tray 5 with two objects for refrigeration K5 and K6 put on it, in an arrangement different from FIG. 5, namely that both objects for refrigeration K5 and K6 are put on the weighing plates 9b and 9c, and only there, at the same time. Thus, neither of the two objects for refrigeration K5, K6 is put by itself on one of the weighing plates 9a to 9p, with the result that the simple calculation of weight by forming the quotient or by directly adding the measured weights cannot be applied.

In the present case, the object weights O(K5) and O(K6) of the objects for refrigeration K5 and K6 respectively can be determined by solving a linear equation system M·x=b, where the determined proportions of the support surfaces A of the objects for refrigeration K5, K6 correspond to the coefficients of the coefficient matrix M, the object weights O(K5) and O(K6) correspond to the unknowns of the vector x, and the weights G(9b) and G(9c) measured at the weighing plates 9b and 9c respectively correspond to the inputs of the vector b. In that case:

$$\begin{pmatrix} A(K5,\ 9b) & A(K6,\ 9b) \\ A(K5,\ 9c) & A(K6,\ 9c) \end{pmatrix} \begin{pmatrix} O(K5) \\ O(K6) \end{pmatrix} = \begin{pmatrix} G(9b) \\ G(9c) \end{pmatrix}$$

with the additional condition O(K5)+O(K6)=G(9b)+G(9c). The columns of the coefficient matrix M correspond to the surface proportions of the respective objects for refrigeration K5, K6, while the rows correspond to the respective surface proportions of the objects for refrigeration K5, K6 on a particular weighing plate 9b, 9c.

Assuming, by way of example, that the following have been measured or determined: A(K5, 9b)=0.5; A(K5, 9c)=0.5; A(K6, 9b)=0.3;A(K6, 9c)=0.7; G(9b)=1.9 kg and G(9c)=3.1 kg, then this equation becomes:

$$\begin{pmatrix} 0.5 & 0.3 \\ 0.5 & 0.7 \end{pmatrix} \begin{pmatrix} O(K5) \\ O(K6) \end{pmatrix} = \begin{pmatrix} 1.9\ \text{kg} \\ 3.1\ \text{kg} \end{pmatrix}$$

with the additional condition O(K5)+O(K6)=5 kg. Solving the linear equation system while taking into account the additional condition gives O(K5)=2 kg and O(K6)=3 kg.

It goes without saying that the present invention is not restricted to the exemplary embodiment shown.

Thus, the linear equation system (including the additional condition) may in principle be applied to any number i of objects for refrigeration Ki, which may in principle be supported on the weighing plates in any way.

The determination or calculation of the object weights O(Ki) of the i objects for refrigeration Ki may be carried out by means of the control unit 7, a controller of the weighing zone 9, and/or (where appropriate in distributed manner) one or more of the external instances S, N.

In general, the above-mentioned variants for determining an object weight may be selected as desired, as may different variants for different objects for refrigeration and/or combinations thereof. Selection may be made for example on the basis of the image evaluation. Thus, in a development it is possible to determine automatically whether:

a) an object weight is calculated by directly adding the measured weights, for example if it has been recognized that the associated object for refrigeration is by itself on the associated weighing plates, b) an object weight is calculated by dividing a measured weight by the surface proportion there, for example if only precisely one object for refrigeration has been recognized on the associated weighing plate, and/or c) an object weight is determined by formal algorithmic solving of a linear equation system.

In general, the terms "one", "a", etc. may be understood as a singular or a plural, in particular in the context of "at least one" or "one or more", etc., provided this is not explicitly ruled out, for example by the phrase "exactly one", etc.

The following is a summary list of reference numerals and the corresponding structure used in the above description of the invention:

1 Refrigerator
2 Refrigerating compartment
3 Refrigerator door
4 Storage compartments
5 Door tray
6 Camera
7 Control unit
8 Communication module
9 Weighing zone
9a-9p Weighing plate
10 Side wall of the door tray
A Support surface
K1-K6 Object for refrigeration
N Network server
R Edge of a support surface of an object for refrigeration
S Mobile user terminal

The invention claimed is:

1. A method for determining an object weight of at least one object that is put on a weighing zone of a household refrigerator, the weighing zone having a plurality of weighing plates disposed in a grid pattern, which comprises the steps of:

measuring respective weights by the weighing plates;
taking at least one image of the weighing zone;

determining from the at least one image, respective percentages of support surfaces of the at least one object stored on the weighing zone in relation to individual ones of the weighing plates;

determining from the respective weights measured at the weighing plates and the respective percentages of the support surfaces, the object weight of the at least one object, wherein when precisely one object is recognized on one of the weighing plates, the object weight is calculated by dividing a respective weight measured at a weighing plate by a percentage of the support surface there; and storing at least the object weight of the at least one object in a database.

2. The method according to claim 1, which further comprising performing an object recognition on the at least one image in relation for the at least one object, and a type of recognized object is stored in the database such that it is linked with the object weight.

3. The method according to claim 1, wherein from the respective weights measured at the weighing plates and the respective percentages of the support surfaces of the at least one object, weight proportions of the object weight of the at least one object on the weighing plates that are occupied are determined, and the object weight is calculated by adding the weight proportions together.

4. A method for determining an object weight of at least one object that is put on a weighing zone of a household refrigerator, the weighing zone having a plurality of weighing plates disposed in a grid pattern, which comprises the steps of:

measuring respective weights by the weighing plates;
taking at least one image of the weighing zone;
determining from the at least one image, respective percentages of support surfaces of the at least one object stored on the weighing zone in relation to individual ones of the weighing plates;
determining from the respective weights measured at the weighing plates and the respective percentages of the support surfaces, the object weight of the at least one object, wherein determining object weights of a plurality of objects by solving a linear equation system M·x=b, where determined proportions of the support surfaces correspond to coefficients of a coefficient matrix M, the object weights correspond to unknowns of vector x, and measured weights correspond to inputs for vector b; and
storing at least the object weight of the at least one object in a database.

5. A method for determining an object weight of at least one object that is put on a weighing zone of a household refrigerator, the weighing zone having a plurality of weighing plates disposed in a grid pattern, which comprises the steps of:

measuring respective weights by the weighing plates;
taking at least one image of the weighing zone;
determining from the at least one image, respective percentages of support surfaces of the at least one object stored on the weighing zone in relation to individual ones of the weighing plates by overlaying the grid pattern of the weighing plates on the at least one image that is taken of the weighing zone for determining the respective percentages of the support surfaces;
determining from the respective weights measured at the weighing plates and the respective percentages of the support surfaces, the object weight of the at least one object; and storing at least the object weight of the at least one object in a database.

6. The method according to claim 5, wherein when precisely one object is recognized on one of the weighing plates, the object weight is calculated by dividing a respective weight measured at a weighing plate by a percentage of the support surface there.

7. A method for determining an object weight of at least one object that is put on a weighing zone of a household refrigerator, the weighing zone having a plurality of weighing plates disposed in a grid pattern, which comprises the steps of:

measuring respective weights by the weighing plates;
taking at least one image of the weighing zone;
determining from the at least one image, respective percentages of support surfaces of the at least one object stored on the weighing zone in relation to individual ones of the weighing plates;
determining from the respective weights measured at the weighing plates and the respective percentages of the support surfaces, the object weight of the at least one object;
storing at least the object weight of the at least one object in a database;
performing an object recognition on the at least one image in relation for the at least one object, and a type of recognized object is stored in the database such that it is linked with the object weight; and
determining a volume of a liquid from the object weight of the at least one object and the type of recognized object being a liquid container.

8. The method according to claim 1, wherein it is determined from the at least one image whether the at least one object has been put by itself on the weighing plates, and then the object weight is determined directly from the respective weights measured at the weighing plates.

9. The method according to claim 1, which further comprises measuring the respective weights by the weighing plates at specific points in time.

10. A refrigerating device, comprising:
a household refrigerator with a refrigerating compartment having a weighing zone with a plurality of weighing plates disposed in a grid pattern, the refrigerating device being programmed to perform a method for determining an object weight of at least one object that is put on said weighing zone of said household refrigerator, the method comprises the steps of:
measuring respective weights by said weighing plates;
taking at least one image of said weighing zone;
determining from the at least one image, respective percentages of support surfaces of the at least one object stored on said weighing zone in relation to individual ones of said weighing plates;
determining from the respective weights measured at said weighing plates and the respective percentages of the support surfaces, the object weight of the at least one object; and
storing at least the object weight of the at least one object in a database.

11. The refrigerating device according to claim 10, wherein said household refrigerator having a door with a door tray, said weighing zone is disposed in said door tray.

12. The refrigerating device according to claim 11, wherein said door tray is made from a transparent material.

13. The refrigerating device according to claim 10, wherein said household refrigerator has a data processing device for performing the method.

14. The refrigerating device according to claim 10, wherein said household refrigerator has a communication device for data exchange with at least one external instance, and is intended for transmitting the respective weights measured and the at least one image to the at least one external instance, and the at least one external instance is intended to determine from the respective weights and the at least one image the object weight of the at least one object.

\* \* \* \* \*